United States Patent

Hoess

[11] Patent Number: 5,956,076
[45] Date of Patent: Sep. 21, 1999

[54] MULTIMEDIA ENABLED NETWORK

[75] Inventor: Rudie Joseph Hoess, North Sydney, Australia

[73] Assignee: Megavision International Pty. Ltd., New South Wales, Australia

[21] Appl. No.: 08/632,481

[22] PCT Filed: Oct. 14, 1994

[86] PCT No.: PCT/AU94/00627

§ 371 Date: Jun. 18, 1996

§ 102(e) Date: Jun. 18, 1996

[87] PCT Pub. No.: WO95/10917

PCT Pub. Date: Apr. 20, 1995

[30] Foreign Application Priority Data

Oct. 14, 1993 [AU] Australia ................................ PM1827

[51] Int. Cl.[6] .............................. H04N 7/01; H04N 7/16
[52] U.S. Cl. ................................ 348/12; 348/15; 348/16; 455/3.1; 455/4.2
[58] Field of Search .................... 348/7, 12, 13, 348/14, 15, 16, 17, 18, 6; 455/3.1, 4.2, 5.1, 6.1, 6.2, 6.3, 5.6; 395/200.09; H04N 7/01, 7/16, 7/173

[56] References Cited

U.S. PATENT DOCUMENTS

| | | | |
|---|---|---|---|
| 4,780,758 | 10/1988 | Lin | 358/86 |
| 4,792,849 | 12/1988 | McCalley | 358/85 |
| 4,885,747 | 12/1989 | Foglia | 455/3 |
| 4,922,486 | 5/1990 | Lidinsky et al. | 370/60 |
| 5,040,171 | 8/1991 | Osaki | 370/17 |
| 5,130,793 | 7/1992 | Bordry | 358/86 |
| 5,170,252 | 12/1992 | Gear | 358/181 |
| 5,183,404 | 2/1993 | Aldous et al. | 439/55 |
| 5,255,267 | 10/1993 | Hansen et al. | 370/85.1 |
| 5,283,789 | 2/1994 | Gunnarsson et al. | 348/6 |
| 5,335,011 | 8/1994 | Addeo et al. | 348/15 |
| 5,361,091 | 11/1994 | Hoarty et al. | 348/7 |
| 5,572,347 | 11/1996 | Burton et al. | 359/125 |

FOREIGN PATENT DOCUMENTS

| | | |
|---|---|---|
| 51135/90 | 12/1992 | Australia . |
| 41220/93 | 12/1993 | Australia . |
| 59274/94 | 9/1994 | Australia . |
| 0352210 | 7/1989 | European Pat. Off. . |
| 0386635 | 3/1990 | European Pat. Off. . |
| 0578573 | 7/1993 | European Pat. Off. . |
| 2558674 | 1/1984 | France . |
| 27 08 625 | 8/1978 | Germany . |
| 1586543 | 3/1981 | United Kingdom . |

*Primary Examiner*—Mark R. Powell
*Assistant Examiner*—Vivek Srivastavia
*Attorney, Agent, or Firm*—Baker & Daniels

[57] ABSTRACT

A network which is suitable for the distribution of signals such as video and audio is disclosed. A second network is overlaid on an existing LAN to provide audio and video functionality, without further loading the capacity of the LAN. Switching of the video and audio signals is provided by a switchbox, controllable from the LAN via the server. The second network may be a simple UTP arrangement.

16 Claims, 5 Drawing Sheets

MULTIMEDIA ENABLED NETWORK

TECHNICAL FIELD

This invention relates to the provision of multimedia capabilities with a communications network.

BACKGROUND ART

The current trend in communications and computer network systems is to provide a broad functionality within an integrated network, capable of handling some or all of voice, text, data, video, and still images. Such systems may also access external or shared resources, (e.g. image databases or video on demand), while allowing for video telephony and collaborative working within the office. Such systems typically use a LAN network within premises and ISDN or similar links to other sites.

Current LAN systems, regardless of topology, generally deliver much less useable bandwidth than is theoretically promised, due to system overheads, compression/decompression at terminals, and other factors. Installation of video capabilities for some or all terminals on an already near capacity LAN is likely to further degrade performance, particularly given the bursty nature and high bandwidth requirements for video. Further, installation of compression/decompression facilities onto terminals requires either very high performance, expensive hardware, or the acceptance of a loss of computation power for other tasks. It is network performance which in current LAN arrangements will provide the ultimate limitation on effective performance.

U.S. Pat. No. 5,170,252 to Gear et al discloses a device for enabling the selective connection of video and audio signals to multiple terminals on a local network. The arrangement disclosed uses a specialised pipeline within the device to carry signals.

It is an object of the present invention to provide an improved arrangement allowing for existing LAN-based systems to cope with video and similar signals, without the need for customised hardware or cabling.

SUMMARY OF INVENTION

According to one aspect the present invention comprises a system providing selective distribution within a network of video and/or audio data, control signals for said video and/or audio data, and further data, characterised in that the further data and control signals are carried on a first digital network, and the video and/or audio data is transmitted over a second, physically distinct cable network, said second network being responsive to said control signals via switching nodes communicating with both networks.

Preferably, the video and/or audio signals are carried in analog format. Preferably, the second network may comprises a series of unshielded twisted pair (UTP) connections, or an optical fibre connection Preferably, at least some of the terminals within said system are operatively connected to both the first and second networks.

According to the present invention, it has been determined that video and audio, or so-called multimedia capacity, can be provided without degrading LAN performance and without requiring purpose built cabling. The present invention uses an overlapping but physically distinct network to provide video and audio capacity, with the existing LAN left to carry digital data. The second network can be simply formed by UTP cabling of the type used for telephone connections, yet allow for fast, high quality video conferencing and video telephony. Indeed, in many office situations, four pairs of UTP are cabled, of which only two are required for the phone system. The other two can be used to implement the present invention. Control remains with the digital system, which via switching nodes and control of the peripheral devices and program sources retains control of the overall system, so as to allow for coordination and synchronisation of media.

BRIEF DESCRIPTION OF DRAWINGS

An illustrative embodiment of the present invention will now be described with reference to the accompanying figures, in which.

DESCRIPTION

Figure 1:
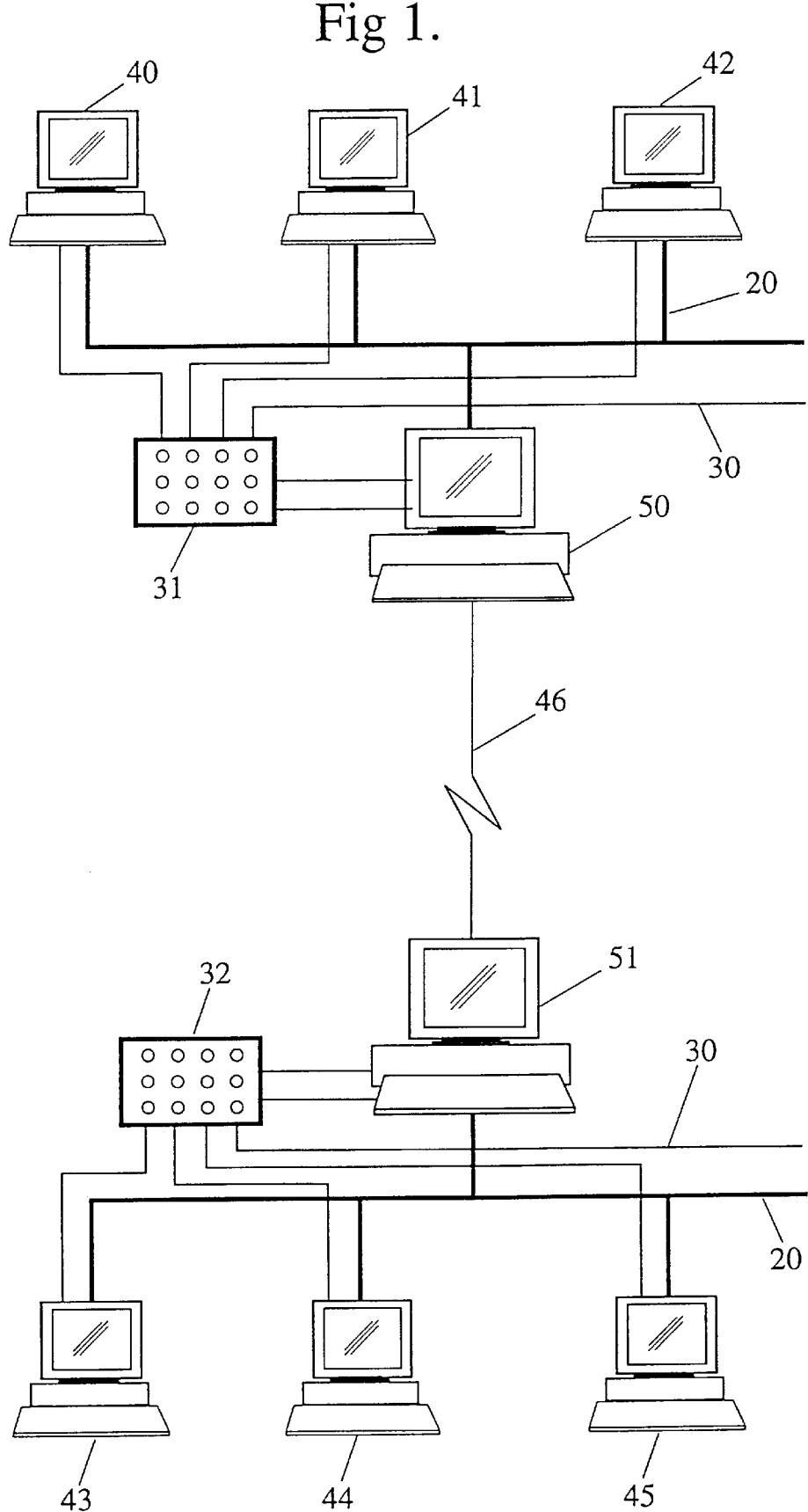
FIG. 1 illustrates the overall arrangement according to a first embodiment of the present invention.

FIG. 1 illustrates schematically the operation of a preferred embodiment of the present invention. As can be seen, two networks are overlayed: a LAN 20 (bold lines) and a set of UTP 30 connections (faint lines). The various screen terminals 40 to 45 are connected to both networks. Conference server devices 50, 51 control communications via ISDN link 46 to the other location 51, 50. It will be appreciated that the UTP connections may be alternatively an optical fibre link, or any other suitable medium. The switching of the UTP network 30 is controlled via switching nodes 31, 32.

Of course, the ISDN connection may be replaced within the general concept of the present invention with other suitable external connections such as microwave links, or amateur TV (ATV) technologies. These may be used to connect various sites utilising the present invention so as to expand the reach of the network and enable further and more complex services and functionality within the network. Such technologies may be particularly applicable to remote communities, and to applications such as distance education. The present invention enables relatively inexpensive switched inhouse audio and video, and so these applications are particularly suitable for the present invention.

Video and audio information is exchanged between parties over the UTP network: other data, and control information for the UTP network, is carried over the LAN. Leaving signals such as video and audio in analog format removes the requirement for significant numbers of elaborate. D/A converters, and in the present configuration provides comparable or better quality than a system with analog to digital conversion taking place at each terminal.

The present invention does not have onerous requirements in terms of hardware for screen terminals. Each screen terminal may comprise a suitable PC platform, with adequate memory and a suitable versions of MS Windows or other comparable software. Preferably, in order to allow adequate definition, the screen used is of at least VGA standard. A 486 or equivalent IBM compatible computer, with a 180MB or larger hard disk and 8 MB of RAM provides a minimum platform. To provide interactIve audio and video functionality, a facility such as Movie Machine PRO which includes a VGA to PAL converter, suitable speakers and microphone, and a video camera such as a Sony Hi-8 are required. Movie Machine is a video overlay board which enables the receive mode for audio and video to become part of the computer display within the MS Windows Graphics shell. Movie Machine enables video display at screen resolutions up to flicker-free 72 Hz at 1024×768 high resolution, and is commercially available from Fast Electronics. If access to sound or image databases, or to RF channels is required, a suitable circuit cards and/or software will be required. All of theses components are readily available commercially.

Figure 3:
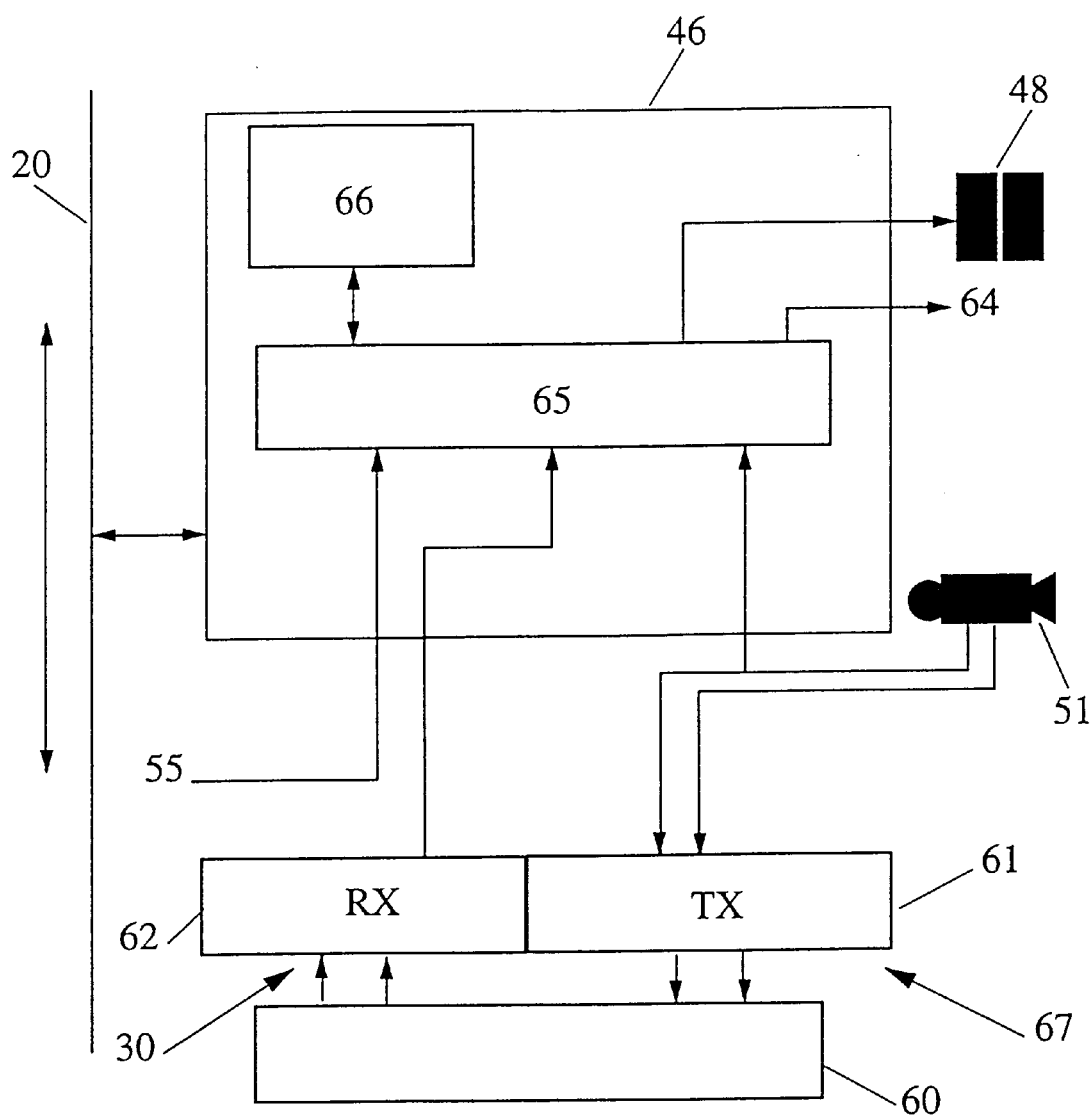
FIG. 3 illustrates schematically a terminal arrangement suitable for use with the present invention.

FIG. 3 illustrates schematically an illustrative arrangement for a terminal 46 connected to the LAN 20 and to the UTP network 30, data from terminal 46 is exchanges with the LAN 20. It is also connected, via Balun 67, to the UTP network 30, and ultimately to switch 31. Balun 67 includes transmitter 61 and receiver 62. The movie machine card 65 receives inputs from the balun, as well as from video camera and microphone 51, and potentially other inputs 63. It produces outputs to speakers 48, display 66, and other outputs 64.

Figure 4:
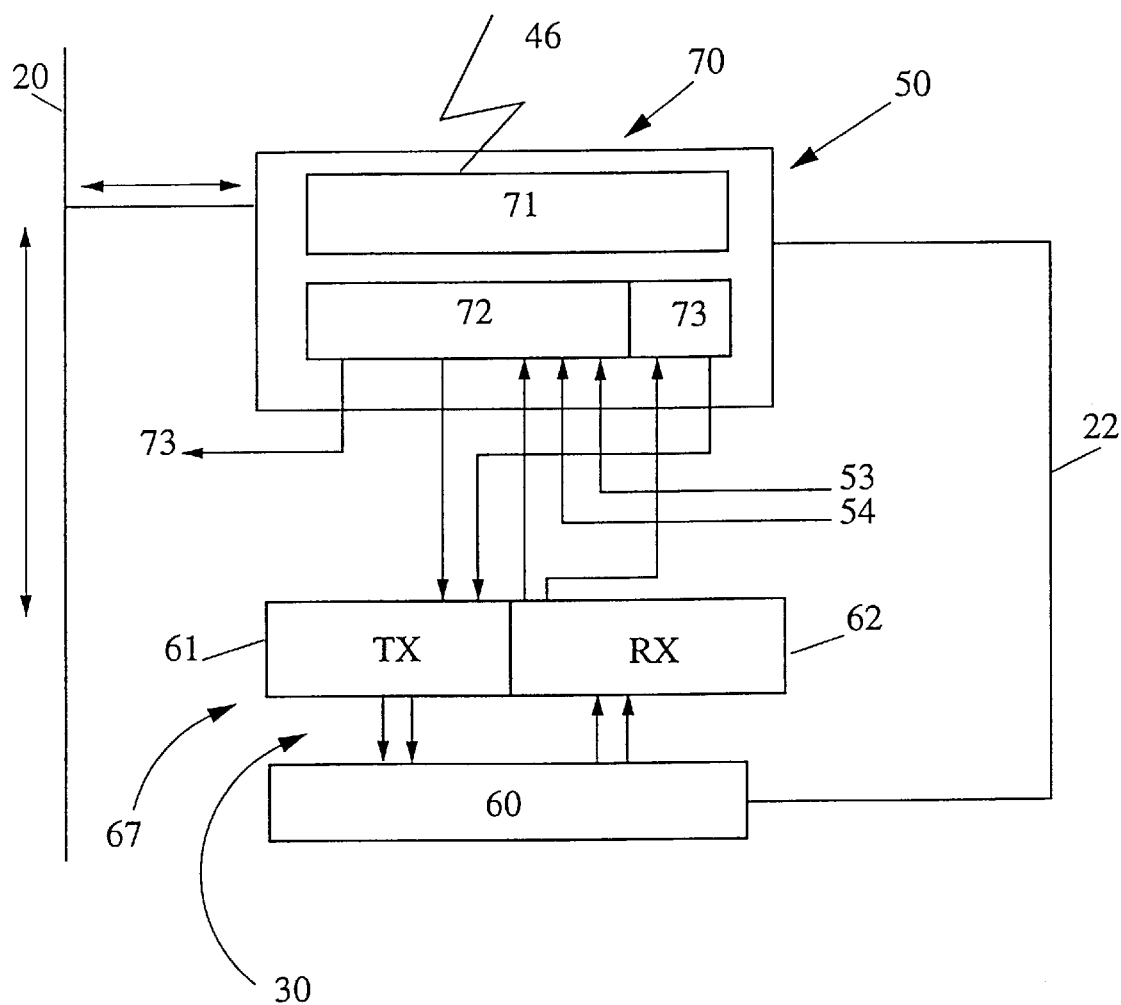
FIG. 4 illustrates schematically a conference server suitable for use with the present invention.

FIG. 4 illustrates a conference server unit 50. Balun 67 is connected to the server hardware 70 as for each terminal 46, and thereby to the UTP network 30 and ultimately switch 60. However, it is also directly connected to switch 60 via a data line 22, for example an RS232 link. The server hardware 70 includes a communications board 71, a codec 72, and audio processor 73. The communications board will of course be determined by the type of remote links, if any, which are provided. Illustratively, it may be an AVM ISDN board. Inputs to the codec may also include stored video such as from a VCR 54, or other sources 53. The codes may be, for example, a VistaCom Codec board.

Figure 2:
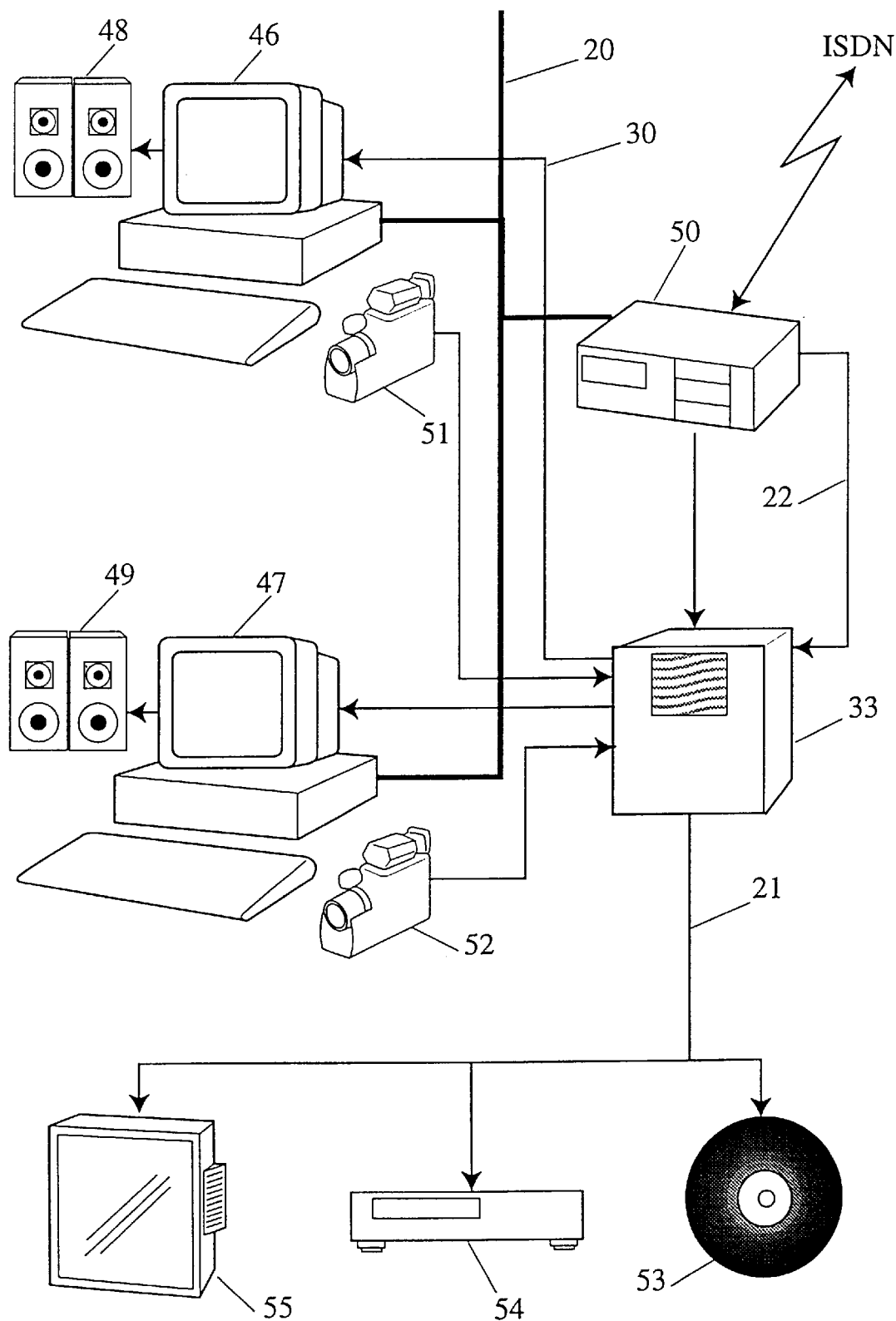
FIG. 2 illustrates a schematic site arrangement in more detail.

FIG. 2 shows the types of interactions and services possible using the inventive system. Terminals 46, 47 are connected to both the LAN 20, and the UTP network 30. Each has associated speakers 48, 49. For video telephony implementation, or security or monitoring purposes, video cameras 51, 52 are connected to the UTP network. Server 50 is connected to the LAN, and provides control signals for the UTP network via switch 33. The connection to switch 33 may be, for example, via RS232. Switch 33 ensures material is switched to the appropriate destinations, under control of the server 50, which in turn may be accessed via LAN-based commands.

Switch 33 may also have further inputs, such as form video disc player 53, VCR 54, and television tuner 55, which can also be accessed by terminals 46, 47.

When utilised as a video telephone or conferencing type system, the video component should allow for concurrent or user selected display of the communicating parties, fully connected for flicker-free high resolution display of live video frames at 350 lines in full 24 bit true colour. If the preferred Windows implementation is used, it is preferred that all video display windows can be freely moved and sized without impeding the functionality of the host PC, which is free to work on applications providing supportive information to assist the communication process. The ability of the LAN to fully support interactive services such as chalkboards and document manipulation is one of the key advantages of the present invention.

Preferably, the system allows for full capture and discussion of two concurrent images during communications. These video sources, as illustrated in FIG. 2, may be generated in-house, such as from video cameras 51, 52, from stored material such as VCR 54 or video disc player 53, or from a converted outside source, such as via TV tuner 55. Images received can preferably be captured to disk or memory for subsequent use in PC based applications with compatible file extensions. Full JPEG compression may be used for captured video images. Commercially available software packages may be used to perform this function.

The UTP switch 33 is preferably a Megavision passive matrix switch, available from the applicants. Any suitable controllable UTP switch could be used. The preferred device can be easily extended by multiple cascading units of similar configuration achieving multiples of 48 connections of audio and video per unit. It has an on board processor and is controlled by software to determine multiple switching configurations via user determined look-up tables. Suitable icons on the user screen allow the desired selection possibilities. Within the UTP network, preferably all physical connections are via industry standard RJ45 connectors using standard UTP cabling, where possible as part of an already existing Building Distribution System.

The present invention is preferably implemented on standard AT&T UTP cabling system, and can carry full frame video with concurrent audio (mono or stereo). A standard AT&T Balun is required between switches (31, 32) and the source. That means that one Balun is required to carry audio/video from each source (send module) and one Balun is required at each receiving end (receive module). When send/receive nodes are specified, a pair of baluns are required, one for the send device (e.g. camera and microphone) and one for the receive device (e.g. screen and speaker system).

Alternatively, if appropriate the signals may be converted to RF, by a commercially available converter, so as to allow for several channels to be carried simultaneously on the cable. Preferably, low channels are selected, for example channel 0. In this case, generally the conversion would take place before the signal passed through the balun, and the receiving device would be equipped to receive and display RF format programming.

Figure 5:
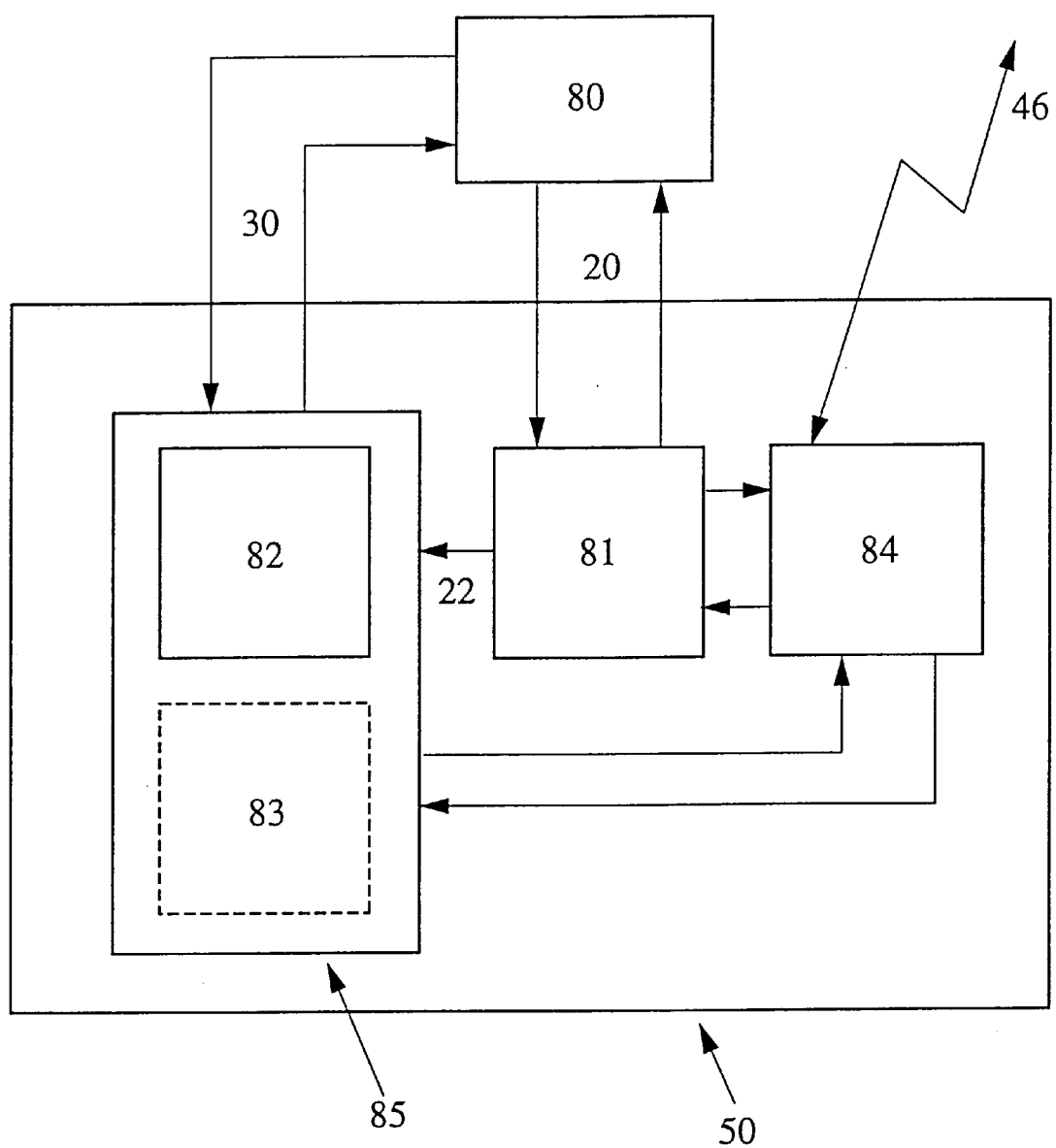
FIG. 5 illustrates in overview a software system to facilitate operation of the illustrated embodiment.

FIG. 5 illustrates the general arrangement of the software system according to an embodiment of the present invention, The preferred implementation has a client-server architecture. It will be appreciated that the precise details of interactions and protocols will be dependant upon the type of hardware components and LAN which are chosen. It is emphasised that the present invention provides a general principle of network arrangement, which can be implemented in many different ways, using commercially available components. User interface agent 80 is resident on each connected user terminal to provide a user interface for access to services including the UTP network. Conference control module 81 controls the establishment, progress and termination of conferences. Communications control 84 prepares compressed video, and connects outside links. Switch control 82 controls the UTP switchbox 85. Finally, video splitter 83 provides a hardware facility for combining individual video streams into a composite image, under software control. Software to perform these functions is generally available commercially, and any necessary additional software can be provided by the skilled network engineer relatively easily.

It will be appreciated that the present invention may be implemented so as to operate on various different LAN systems, and to connect to different LANs via the PSTN or other connections. The present invention is independent of the particular LAN system utilised, and the necessary interface components are largely available as off the shelf items, as would be apparent to those skilled in the art.

The present invention allows for the use of an extensive user interface, which while not essential tho the invention, magnifies its benefits. Preferably, such a user interface is based on MS/Windows and should cater for comprehensive functions related to image display, data capturing, communications variables, auto clock, data transmissions, image capturing and interactive application software available during active communications.

The present invention is also suitable for audio and video distribution. Audio-mono, stereo or left and right track separation (for bilingual sources) sound may be supported, and distributed to each node synchronised to video. Sound can be connected to existing audio systems or can be delivered via additional speaker sets or handsets. Audio should be switched together with video at all times to ensure correct sound with selected video source.

The communications link 46 preferably provides full H.621 Codec capability, and complies with necessary CCITT recommendations (H.221, H.261 and H.242) for video conferencing. It preferably will handle both NTSC and PAL format material.

Thus, if implemented using the above principles, the present invention will work independent of geography or source format (PAL or NTSC). The video display will detect and display a PAL or NTSC originated image.

Preferably, video encoding and decoding are performed in full duplex, supporting simultaneous encoding of transmitted and received signals, regardless of video standards, PAL and NTSC at nominal frame rates of 25 Hz and 30 Hz respectively. Video display is equally conforming to these frame rates, but is decoded to display on high resolution PC monitors at 840×480 or 800×600 resolutions for up to 38 kHz horizontal display frequency. This guarantees absolutely sharp and flicker-free images for subsequent usage as video data where desired.

Both an audio input multiplexer and an audio amplifier are provided in a preferred implementation, allowing for telephone handset or microphone (line input) under software control. Audio attenuation and echo suppressor are preferably provided to compensate for various output devices (loudspeakers, external amplifier) and possible audio circulation (Echo) between input and output.

It will be appreciated that the video enabled terminal described and conference server may be assembled from readily available hardware and software components—any suitable configuration may be used.

Although the foregoing discussion of an illustrative embodiment of the present invention has proceeded on the basis of discussion principally of a UTP network for audio/video, the reader will appreciate that other technologies may be used for this network it desired or required in a particular environment, for example optical fibre connections.

It will be understood that the implementation described is purely illustrative, and is not limitative of the general inventive concept. It will be appreciated that variations and additions are possible within the general inventive concept.

I claim:

1. A system providing selective distribution within a network including a plurality of user terminals of video and/or audio data, control signals for said video and/or audio data, and further data, characterised in that the further data and control signals are carried on a first digital network, and the video and/or audio data is transmitted over a second, physically distinct analog cable network, said terminals being connected to both the first and second networks, said second network being responsive to said control signals via switching nodes communicating with both networks, said switching nodes being shared on the second network and not being associated with individual ones of said user terminals.

2. A system according to claim 1, wherein said second network comprises a series of unshielded twisted pair (UTP) connections.

3. A system according to claim 1, wherein each user terminal uses a discrete connection to the switching node.

4. A system according to claim 1, wherein said second network includes sources of analog video signals, said sources being arranged so that their signals are switched via said switching nodes.

5. A system according to claim 1, wherein at least one switching means is provided within said second network, such that said switching means responds directly or indirectly to control signals sent over said first network.

6. A system according to claim 2, wherein each user terminal uses a discrete connection to the switching node.

7. A system according to claim 2, wherein said second network includes sources of analog video signals, said sources being arranged so that their signals are switched via said switching nodes.

8. A system according to claim 3, wherein said second network includes sources of analog video signals, said sources being arranged so that their signals are switched via said switching nodes.

9. A system according to claim 6, wherein said second network includes sources of analog video signals, said sources being arranged so that their signals are switched via said switching nodes.

10. A system according to claim 2, wherein at least one switching means is provided within said second network, such that said switching means responds directly or indirectly to control signals sent over said first network.

11. A system according to claim 3, wherein at least one switching means is provided within said second network, such that said switching means responds directly or indirectly to control signals sent over said first network.

12. A system according to claim 4, wherein at least one switching means is provided within said second network, such that said switching means responds directly or indirectly to control signals sent over said first network.

13. A system according to claim 6, wherein at least one switching means is provided within said second network, such that said switching means responds directly or indirectly to control signals sent over said first network.

14. A system according to claim 7, wherein at least one switching means is provided within said second network, such that said switching means responds directly or indirectly to control signals sent over said first network.

15. A system according to claim 8, wherein at least one switching means is provided within said second network, such that said switching means responds directly or indirectly to control signals sent over said first network.

16. A system according to claim 9, wherein at least one switching means is provided within said second network, such that said switching means responds directly or indirectly to control signals sent over said first network.

* * * * *